United States Patent
Rowe (10) Patent No.: US 8,745,172 B1
(45) Date of Patent: Jun. 3, 2014

(54) PRE-LOADED IDENTIFIERS TO IDENTIFY MEDIA CONTENT FOR MOBILE DEVICES USING CAPTURED AUDIO

(75) Inventor: Simon Rowe, Berkshire (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/118,168

(22) Filed: May 27, 2011

Related U.S. Application Data (60) Provisional application No. 61/469,471, filed on Mar. 30, 2011.

(51) Int. Cl.
*G06F 13/00* (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

2011/0247042 A1* 10/2011 Mallinson ....................... 725/86

OTHER PUBLICATIONS

Response to Office Action dated Sep. 13, 2012, from U.S. Appl. No. 13/250,877, dated Dec. 13, 2012, 12 pgs.
Response to Office Action dated Sep. 14, 2012, from U.S. Appl. No. 13/445,508, dated Dec. 14, 2012, 12 pgs.
Office Action from U.S. Appl. No. 13/250,877, dated Sep. 13, 2012, 6 pp.
Office Action from U.S. Appl. No. 13/445,508, dated Sep. 14, 2012, 6 pp.
Cano et al., "A Review of Algorithms for Audio Fingerprinting" [online]. Multimedia Signal Processing, 2002 IEEE Workshop, Issue Date Dec. 9-11, 2002. Retrieved from the Internet: <URL:http://citeseerx.ist.psu.edu/viewdoc/download?doi=10.1.1.103.2175&rep=rep1&type=pdf> (5 pgs.).
Haitsma et al., "A Highly Robust Audio Fingerprinting System," [online]. 2002. Retrieved from the Internet: <http://citeseerx.ist.psu.edu/viewdoc/download?doi=10.1.1.12.5697&rep=rep1&type=pdf> (9 pgs.).
Liu et al., "Audio Fingerprinting Based on Multiple Hashing in DCT Domain," IEEE Signal Processing Letters, vol. 16, No. 6, Jun. 2009. Retrieved from the Internet: <http://hi.snu.ac.kr/hm_j/public_html/upload_dir/pub/1_y.liu_Audio% 20Fingerprinting%20Based%20on%20Multiple%20Hashing%20in%20DCT%20Domain.pdf> (4 pgs).
"Acoustic fingerprint," From Wikipedia, the free encyclopedia, [online]. Last modified on Feb. 14, 2011. Retrieved from the Internet: <http://en.wikipedia.org/wiki/Acoustic_fingerprint> (4 pgs.).

(Continued)

*Primary Examiner* — Robert B Harrell
(74) *Attorney, Agent, or Firm* — Shumaker & Sieffert, P.A.

(57) ABSTRACT

In general, embodiments of the present disclosure are directed to techniques for determining a user's potential exposure to defined audio content (e.g., television and audio advertisements) using a mobile device. In one example, a method includes receiving first audio content. The method further includes generating a first digital representation of the first audio content. The method also includes accessing a data structure, wherein the data structure contains at least a second digital representation of at least second audio content. The method also includes comparing the first digital representation to at least the second digital representation contained in the data structure and if there is a match between the first digital representation and at least the second digital representation contained in the data structure, transmitting a message to a remote server indicating the match.

23 Claims, 5 Drawing Sheets

(56) References Cited

OTHER PUBLICATIONS

Hatch, "A Quick Review of Audio Fingerprinting," [online]. Mar. 12, 2003. Retrieved from the Internet: <http://www.google.com/search?q=a+Quick+Review+of+Audio+Fingerprinting&rls=com.microsoft:en-us:IE-Address&ie=UTF-8&oe=UTF-8&sourceid=ie7&rlz=1I7ADFA_en> (4 pgs.).

Final Office Action from U.S. Appl. 13/445,508, dated Apr. 26, 2013, 9 pp.

Responsive amendment from U.S. Appl. No. 13/250,877, filed Sep. 4, 2013, 11 pages.

Non-Final Office Action from U.S. Appl. No. 13/250,877, dated Oct. 3, 2013, 9 pp.

Final Office Action from U.S. Appl. No. 13/250,877, dated Jun. 5, 2013, 9 pp.

Pre-Appeal Brief Request for Review and Notice of Appeal from U.S. Appl. No. 13/445,508, filed Jul. 17, 2013, 6 pp.

Response to Office Action dated Oct. 3, 2013 from U.S. Appl. No. 13/250,877, filed Jan. 3, 2014, 10 pp.

Examiner's Answer from U.S. Appl. No. 13/445,508, dated Jan. 16, 2014, 8 pp.

Notice of Allowance from U.S. Appl. No. 13/250,877, 5 pages, dated Feb. 26, 2014 pp.

\* cited by examiner

PRE-LOADED IDENTIFIERS TO IDENTIFY MEDIA CONTENT FOR MOBILE DEVICES USING CAPTURED AUDIO

RELATED APPLICATIONS

This application claims the benefit of U.S. Provisional Application No. 61/469,471, filed Mar. 30, 2011, the entire content of which is incorporated herein in its entirety.

TECHNICAL FIELD

This disclosure relates to use patterns of mobile devices.

BACKGROUND

A user may interact with applications executing on a computing device (e.g., mobile phone, tablet computer, smart phone, or the like). For instance, a user may install, view, or delete an application on a computing device.

In some instances, a user may use a mobile device (e.g., mobile phone, tablet computer, smart phone, or the like) in proximity to a broadcast. For instance, a user may watch a television broadcast while interacting with a mobile device.

SUMMARY

In one example, a method includes, receiving, by a mobile device, first audio content. The method further includes generating, by the mobile device, a first digital representation of the first audio content. The method also includes accessing, by the mobile device, a data structure stored by the mobile device, wherein the data structure contains at least a second digital representation of at least second audio content. The method further includes comparing, by the mobile device, the first digital representation to at least the second digital representation contained in the data structure; and if there is a match between the first digital representation and at least the second digital representation contained in the data structure, transmitting, by the mobile device, a message to a remote server indicating the match.

In one example, a computer-readable storage medium is encoded with instructions that cause one or more processors of a computing device to perform operations including receiving first audio content. The computer-readable storage medium is further encoded with instructions that cause one or more processors of a computing device to generate a first digital representation of the first audio content and access a data structure stored by the mobile device, wherein the data structure contains at least a second digital representation of at least second audio content. The computer-readable storage medium is further encoded with instructions that cause one or more processors of a computing device to compare the first digital representation to at least the second digital representation contained in the data structure; and if there is a match between the first digital representation and at least the second digital representation contained in the data structure, transmitting a message to a remote server indicating the match.

In one example, a computing device includes one or more processors. The computing device also includes an identification module operable by the one or more processors to receive first audio content and generate a first digital representation of the first audio content; wherein the identification module is operable by the one or more processors to access a data structure stored by the mobile device, wherein the data structure contains at least a second digital representation of at least second audio content. The computing device further includes means for comparing the first digital representation to at least the second digital representation contained in the data structure. The identification module is further operable by the one or more processors to transmit a message indicating a match to the remote server if there is a match between the first digital representation and at least the second digital representation contained in the data structure.

The details of one or more examples of this disclosure are set forth in the accompanying drawings and the description below. Other features, objects, and advantages of the disclosure will be apparent from the description and drawings, and from the claims.

DETAILED DESCRIPTION

In general, embodiments of the present disclosure are directed to techniques for determining a user's potential exposure to defined audio content (e.g., television and audio advertisements) using a mobile device. In the past, mobile devices may have lacked the processing power and data bandwidth necessary to capture and process information in real-time. Recent advancements in computer technology, however, have transformed mobile devices into powerful platforms for sending, receiving, and processing information. Embodiments of the present disclosure utilize these improvements in mobile device performance to measure a user's exposure to television and audio advertisements.

For example, certain aspects of the present disclosure make use of the fact that, generally, only approximately 500-2000 advertisements may be of interest to an individual or system that measures user exposure to such content. Consequently, the approximately 500-2000 advertisements may be pre-selected, e.g., a remote server may create pre-selected audio identifiers in advance that correspond to each advertisement. In one example, the remote server may send the pre-selected audio identifiers to a mobile device for storage prior to a user's exposure to the advertisements. The mobile device may, at a later time, capture one or more audio signals corresponding to advertisements in proximity to the user. Using the captured one or more audio signals, an application executing on the mobile device may attempt to identify an external audio identifier in the one or more captured audio signals. If the application identifies an external audio identifier, the external audio identifier may then be compared with the pre-selected audio identifiers on the mobile device using a matching algorithm that places low resource requirements on the device.

In some examples, the mobile device may transmit a "hit" to the remote server indicating a match when the degree of similarity between a pre-selected audio identifier and an external audio identifier is within a first probability interval that indicates, e.g., a high degree of similarity between the audio identifiers. In other examples, the degree of similarity between the audio identifiers may be within a second similarity interval. The second similarity interval may include a range of one or more degrees of similarity that are less than the degrees of similarity included in the first probability interval. For example, the second similarity interval may indicate a moderate degree of similarity between an external audio identifier and a pre-selected audio identifier. A degree of similarity between the audio identifiers that is within the second similarity interval may also indicate a match. In such examples, however, the mobile device may transmit the external audio identifier or a digital representation of the audio content to the remote server for more detailed analysis and matching. In still other examples, if the degree of similarity between the pre-selected audio identifier and the external audio identifier is not within any similarity interval indicating a match, there may be no match and therefore no data may be sent to the remote server. Thus, localized processing of external audio identifiers on the mobile device using a highly-relevant subset of pre-selected audio identifiers enables an individual or system to measure a user's exposure to advertisements while minimizing resource usage on both the mobile device and the remote server.

Figure 1:
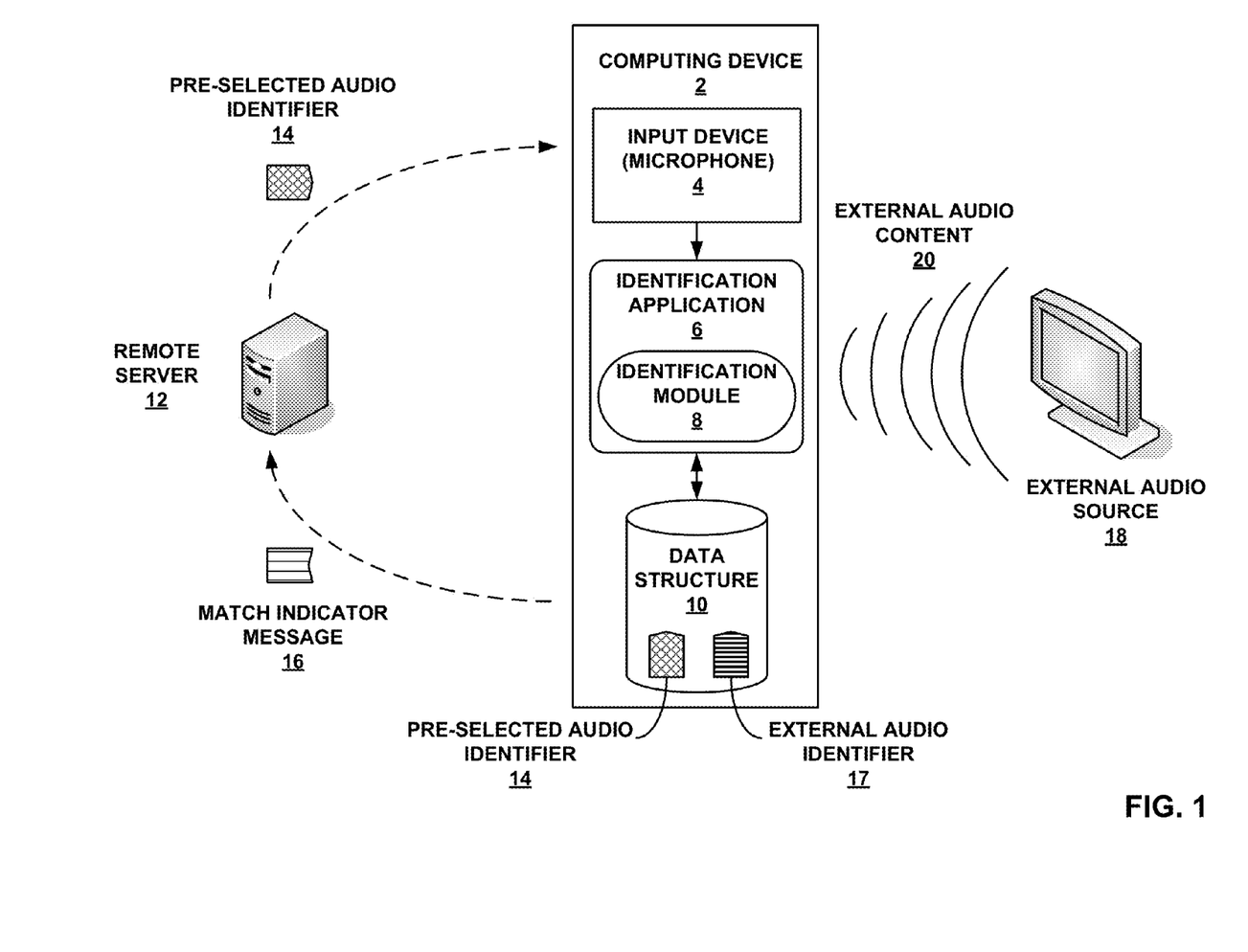
FIG. 1 is a block diagram illustrating an example of a computing device that may be configured to execute one or more applications, including an identification application, and to receive a user input, in accordance with one or more aspects of the present disclosure.

FIG. 1 is a block diagram illustrating an example of a system including a computing device 2 that may be configured to execute one or more applications, e.g., identification application 6, in accordance with one or more aspects of the present disclosure. Computing device 2 may, in some examples, include or be a part of a portable computing device (e.g. mobile phone/netbook/laptop/tablet device) or a desktop computer. Computing device 2 may also connect to a network including a wired or wireless network. In some examples, computing device 2 includes an input device (e.g., microphone) 4. Input device 4 is described in further detail in FIG. 2 and may include a microphone, camera, or any other device capable of receiving input from an external source, e.g., external audio source 18.

In some examples, computing device 2 receives information from a remote server 12. Remote server 12 may include one or more desktop computers, mainframes, minicomputers, or other computing devices capable of executing computer instructions and storing data. In some examples, remote server 12 sends audio identifiers including, e.g., pre-selected audio identifier 14, to computing device 2 via a network (not shown). In other examples, remote server 12 receives information including, e.g., match indicator message 16 or a representation of audio content from computing device 2 via a network. A network may include any wired or wireless network such as the Internet or a wireless 3G network. Remote server 12 may also perform other functions including identification of audio content using audio identifiers as described hereinafter.

In some examples, remote server 12 generates one or more pre-selected audio identifiers 14. Pre-selected audio identifier 14 may include a digital representation of audio content. Audio content, in some examples, includes an audio signal. For example, audio content may include an audio signal from a television advertisement, radio broadcast, digital music file and/or streaming Internet video. Audio content may, more generally, include an audio signal from any type of media.

In some examples, the digital representation of audio content included in pre-selected audio identifier 14 is used to identify audio content. To identify audio content, a digital representation of audio content may include data representing an audio signal in audio content. In one example, the digital representation of audio content includes a subset of data that is approximately perceptually equivalent to the audio content itself. Generally, the data size of the digital representation of audio content may be small relative to the audio content that it identifies. The small size of the digital representation of audio content may be achieved by including only unique and/or relevant features of the audio content in the digital representation.

Well-known techniques exist to identify audio content based on an audio identifier. In some examples, a computer application executing on a computing device, e.g., remote server 12 and/or computing device 2, includes a matching algorithm that compares a digital representation of audio content with audio content to identify a match. A match may indicate approximate perceptual equivalence between the pre-selected audio identifier and the audio content. In one example, a digital representation of the audio content from an external audio source is compared with the digital representation of audio content contained in pre-selected audio identifier 14, and if the comparison indicates sufficiently similar perceptual equivalence, a match is identified.

Numerous matching algorithms exist that employ techniques to compare, e.g., a zero crossing rate, estimated tempo, average spectrum, spectral flatness, prominent tones, or Fourier coefficients. Matching algorithms are characterized by tradeoffs in accuracy and computational resource requirements. For example, highly accurate matching algorithms may require substantial computing resources, while less accurate matching algorithms may require fewer computing resources.

In some examples, a matching algorithm that compares a rate of zero-crossings requires fewer computing resources than, for example, a matching algorithm that compares Fourier coefficients. For example, an audio signal may be expressed as a sine wave function. A zero crossing may refer to a point at which the sign of the sine wave function changes (e.g. from positive to negative), represented by a crossing of the axis (zero value) in the graph of the function. Each audio signal may thus be characterized by a specific pattern of zero crossings. In some examples, the pattern of zero crossing may correspond to a rate of zero crossings. In one example the rates of zero crossings of two digital representations of audio content may be compared to identify perceptual equivalence. Although, in some examples, comparing rates of zero crossings may be less accurate, the technique may be less computationally expensive.

In contrast to comparing rates of zero-crossings, a matching algorithm may, for example, compare Fourier coefficients to identify perceptual equivalence in audio content. In some examples, an audio signal may be divided into frames and a Fourier transform may be applied to each frame thereby producing a corresponding Fourier coefficient. In one example, each Fourier coefficient may correspond to a value such as, a function, quantity, or other representation that approximately represents a perceptual feature of the audio signal of the audio content. Although techniques employing Fourier transforms may be more accurate than comparing rates of zero-crossings, such techniques may be computationally expensive. In certain applications where processing and energy resources are important design constraints, e.g., implementing a match algorithm on a computing device, a rate of zero crossing comparison technique may be more suitable than a Fourier transform technique. For example, it may be desirable to implement a zero-crossing matching algorithm on a mobile device, e.g., computing device 2, and a Fourier transform matching technique on a server, e.g., remote server 12.

In the example of FIG. 1, remote server 12 may generate one or more pre-selected audio identifiers 14 using generating algorithms that employ techniques similar to the aforementioned matching algorithms. For example, a generating algorithm executing on remote server 12 may initially segment an audio signal of audio content, e.g., external audio content 20 into frames. The generating algorithm may then identify one or more distinguishing audio features of each frame. Distinguishable features of a frame may include a zero crossing rate, estimated tempo, average spectrum, spectral flatness, prominent tones, or Fourier coefficients. In some examples, the one or more distinguishing audio features may be included in a compact data structure, such as a pre-selected audio identifier 114. Many well-known generating algorithms implement the aforementioned generating and matching techniques.

Each pre-selected audio identifier 14 may, in some examples, correspond to an advertisement. For example, the advertisement may be a television advertisement or radio advertisement that includes audio content. Each pre-selected audio identifier 14 may be used to identify a corresponding advertisement that includes the audio content. Remote server 12 may store, in a database, each pre-selected audio identifier 14, advertisement data such as an advertisement name and/or description corresponding to the advertisement, and associations between each pre-selected audio identifier and data representing the advertisement.

In some examples, marketing firms, producers of products or services, or other research firms may seek to identify how often a user is exposed to an advertisement. Such research firms may analyze user exposure to advertisements in order to identify effective techniques for marketing products. For example, a research firm may perform statistical analyses to identify correlations between advertisement exposure and product sales. To identify how often a user is exposed to an advertisement, a mobile device may be employed to analyze audio content of advertisements received from audio sources. Because a user may keep his mobile device in close proximity at all times, audio content received by the user may also be received by the computing device. Techniques of the present disclosure take advantage of the frequent proximity of the mobile device to the user and the increased power of mobile devices to identify how often a user is exposed to an advertisement.

In some examples, remote server 12 may send one or more pre-selected audio identifiers 14 to computing device 2. Computing device 2 may store one or more pre-selected audio identifiers 14 in data structure 10. In one example, data structure 10 contains at least one digital representation of audio content. In other examples, multiple digital representations of multiple different audio content may be stored in data structure 10. In some examples, a pre-selected audio identifier 14 may include a digital representation of audio content. Computing device 2 may further include an input device 4, e.g., a microphone that is capable of receiving audio content. In some examples, computing device 2 may receive external audio content 20 from an external audio source 18. External audio source 18 may be a television, radio, or other source of audio content. In other examples, computing device 2 may receive audio content from computing device 2 itself. For example, a user may view a video stored on computing device 2 or received via a network stream that contains audio content.

In some examples, computing device 2 may execute an identification application 6. Identification application 6 may include one or more matching algorithms and one or more audio identifier generating algorithms as previously described herein. In some examples, the one or more matching algorithms and/or one or more audio identifier generating algorithms may be included in an identification module 8 of identification application 6. A user may initially launch identification application 6 upon powering on computing device 2. In some examples, identification application 6 may execute as a background process. When executing, identification application 6 may receive audio content from input device 4. For example, computing device 2 may be in close proximity to a user and receive external audio content 20 from external audio source 18. Input device 4 may receive external audio content 20 and identification application 6 may receive external audio content 20 from input device 4.

In some examples, identification application 6 may process external audio content 20 using an audio identifier generating algorithm. For example, an audio identifier generating algorithm may generate a digital representation of external audio content 20. In some examples, the audio generating algorithm used by computing device 2 to generate external audio identifier 17 may be the same or similar to the audio generating algorithm used by remote server 12 to generate pre-selected audio identifier 14. In one example, the digital representation of external audio content 20 may be included in an external audio identifier 17. External audio identifier 17 may identify external audio content 20. In some examples, external audio identifier 17 may be compared with other audio identifiers to identify a match. External audio identifier 17 may, in some examples be stored in data structure 10. Any suitable data structure for storing and retrieving data may be used to store audio identifiers and/or digital representations of audio content. Examples of suitable data structures may include a database, list, map, or lookup table. Data structure 10 may include multiple digital representations of various, different audio content. Computing device 2 may access data structure 10 to select one or more digital representations of audio content and/or audio identifiers.

In some examples, identification application 6 may use a matching algorithm to compare an external audio identifier and a pre-selected audio identifier to identify a match. To identify a match, the matching algorithm may compare a digital representation of audio content in external audio identifier 17 and a digital representation of audio content in the pre-selected audio identifier 14. In some examples, the matching algorithm may identify a match when the degree of similarity between a digital representation of audio content in external audio identifier 17 and a digital representation of audio content in the pre-selected audio identifier 14 is within a similarity interval. In such examples, a similarity interval includes a range of degrees of similarity. A degree of similarity may be a ratio of perceptual equivalence between a digital representation of audio content in external audio identifier 17 and a digital representation of audio content in the pre-selected audio identifier 14.

In some examples, a degree of similarity may include a ratio of perceptual equivalence between the digital representation of the first audio content and the digital representation of the second audio content. In some examples, a ratio of perceptual equivalence may correspond to the percentage of data that is approximately identical between a digital representation of first audio content and a digital representation of second audio content. In one example, a ratio of perceptual equivalence between two different digital representations may be approximately 0.97 or, stated another way, the two digital representations are approximately 97% identical. Furthermore, a similarity interval may include a range, e.g., approximately 0.90 to 1.0. When the ratio of perceptual equivalence between two digital representations falls within the similarity interval, a match exists. In some examples, the similarity interval may be defined by a user.

In some examples, application 6 may specify two or more similarity intervals such that each similarity interval comprises a range of degrees of similarity. For example, application 6 may specify a first similarity interval and a second similarity interval. In such an example, each degree of similarity in the first range may be greater than each degree of similarity in the second range. Thus, in one example, a degree of similarity between two digital representations that is within the first interval may indicate, e.g., a high degree of similarity while a degree of similarity that is within the second interval may indicate a moderate degree of similarity.

Continuing with the current example, when the degree of similarity between pre-selected audio identifier 14 and external audio identifier 17 is within a similarity interval, computing device 2 may send a match indicator message 16 to remote server 12. Match indicator message 16 may include any information that indicates a match between pre-selected audio identifier 14 and external audio identifier 17.

In the current example, application 6 may include "hit" data in match indicator message 16 that indicates a match when the degree of similarity between pre-selected audio identifier 14 and external audio identifier 17 is within the first interval, e.g., indicating a high degree of similarity. Hit data that indicates a match may smaller than a digital representation of audio content. For example, hit data indicating a match may include a unique identifier that identifies external audio content. Thus, sending hit data indicating a match rather than a digital representation of audio content may advantageously minimize network communication between computing device 2 and remote sever 12. In some examples, computing device 2 may transmit a probability of a match between pre-selected audio identifier 14 and external audio identifier 17 in match indicator message 16.

In the current example, application 6 may include external audio identifier 17 in match indicator message 16 when the degree of similarity between pre-selected audio identifier 14 and external audio identifier 17 is within the second interval, e.g., indicating a moderate degree of similarity. In this way, a match that indicates a moderate degree of similarity between pre-selected audio identifier 14 and external audio identifier 17 may be communicated to remote server 12. In such examples, remote server 12 may perform additional processing on external audio identifier 17 to determine the degree of similarity between pre-selected audio identifier 14 and external audio identifier 17 with greater precision.

Continuing with the current example, in some instances, the degree of similarity between pre-selected audio identifier 14 and external audio identifier 17 may not be within either the first interval or the second interval. In such instances, there may be no match between pre-selected audio identifier 14 and external audio identifier 17 when the degree of similarity between pre-selected audio identifier 14 and external audio identifier 17 is not within any similarity interval that indicates a match. In other examples, there may be no match when a degree of similarity is within a similarity interval that indicates no match.

In one example, a ratio of perceptual equivalence between pre-selected audio identifier 14 and external audio identifier 17 may be approximately 0.55 or, stated another way, the two digital representations are approximately 55% identical. Furthermore, the first similarity interval may include a range, e.g., approximately 0.90 to 1.0. The second similarity interval may include a range, e.g., approximately 0.8 to 0.89. Because the ratio of perceptual equivalence between the two different digital representations falls outside of any similarity interval indicating a match, there may be no match. When there is no match, application 6 may refrain from transmitting a match indicator message from computing device 2 to the remote server 12. In this way, network communication between computing device 2 and remote server 12 may be minimized in some examples by refraining from transmitting match indicator messages when there is no match.

In some examples, it may be beneficial to implement a "light-weight" matching algorithm in identification application 6 executing on computing device 2 to perform the aforementioned techniques. In some examples, a light-weight matching algorithm may consume fewer resources, e.g., processing and energy requirements, than other more accurate matching algorithms. In one example, a lightweight matching algorithm may include comparing the rates of zero-crossings of a first digital representation of first audio content and at least a second digital representation of at least second audio content. Embodiments of the present disclosure may implement a light-weight matching algorithm on computing device 2 to identify matches between external audio identifier 17 and pre-selected audio identifier 14. In this way, computing device 2 can save energy and processing requirements, while identifying matches locally on computing device 2 rather than sending each external identifier 17 to remote server 12. In this way, match indicator messages may only be sent to remote server when a match is detected, thereby minimizing network communication and power requirements. In some examples, a user may specify that only a pre-defined quantity of comparisons is performed by a matching algorithm. In such examples, limiting the number of comparisons performed by the matching algorithm may conserve processing and energy requirements.

In some examples, it may be beneficial to selectively send only a subset of audio identifiers, e.g., pre-selected audio identifiers 14, to computing device 2. For example, a research firm may only be interested in 500-2000 advertisements to which a user is exposed. Thus, remote server 12 may generate many audio identifiers and send only the relevant subset of pre-selected audio identifiers 14 to computing device 2. In this way, the storage requirements of computing device 2 to store pre-selected audio identifiers 14 are minimized.

Computing device 2 may receive updated audio identifiers using a variety of techniques. For example, computing device 2 may request updated audio identifiers responsive to a user request or automatically based on a schedule. In other examples, remote server 12 may send updated audio identifiers using data push techniques. For example, a remote server 12 may detect or generate one or more updated audio identifiers on remote server 12. Responsive to detecting and/or generating the updated audio identifiers, remote server 12 may send the updated audio identifiers to computing device 2. In other examples, remote server 12 may send updated audio identifiers to computing device 2 based on a schedule. Any other well-known techniques for updating data may also be used such that audio identifiers of computing device 2 may remain continually updated.

In some examples, computing device 2 may delete audio identifiers to manage storage resources of computing device 2. For example, computing device 2 may include a storage limit defined by a user or application that indicates a maximum storage space usable to store audio identifiers. When updated audio identifiers are received by computing device 2, computing device 2 may check the storage limit and delete audio identifiers if the limit is exceeded when additional updated audio identifiers are stored. In some examples, information may be included with the updated audio identifiers indicating which existing audio identifiers may be deleted by computing device 2. In other examples, computing device 2 may include one or more policies that indicate which audio identifiers may be deleted when storing additional audio identifiers would exceed the storage limit. For example, a policy may indicate that older audio identifiers are deleted before newer audio identifiers when the storage limit is exceeded. A policy, more generally, may include one or more rules that specify which existing audio identifiers may be deleted when the storage limit is exceeded.

Techniques of the present disclosure may be adapted for use with image content such as a video (e.g., moving image) or picture (e.g., still image). For example, computing device 2 may include an input device such as a camera capable of receiving and/or recording video content. Computing device 2 may, in some examples, use the camera to receive the video content and generate a digital representation of the video content. Computing device 2 may generate a digital representation of the video content using various well-known techniques similar to those described for audio content.

Computing device 2 may be further pre-loaded with pre-selected digital representations of video content. Using similar techniques described for audio content, the computing device may compare the digital representation of the video content received via the camera of the computing device with one or more pre-loaded digital representations. If there is a match between the digital representation and one or more of the pre-loaded digital representations, the computing device may transmit a message to the remote server. For example, the message may indicate the computing device has received video content identified by the one or more matching pre-loaded digital representations.

In one example use case, a camera of computing device 2 may receive visual information corresponding to a video advertisement. Computing device 2 may further include one or more pre-loaded digital representations of video content. Upon receiving the visual information corresponding to the advertisement, computing device 2 may generate a digital representation of the advertisement. Computing device 2 may access the one or more pre-loaded digital representations and compare such representations to the digital representation of the advertisement generated by computing device 2. If a match exists between the generated digital representation of the advertisement and one or more of the pre-loaded digital representations, computing device 2 may transmit a message to a remote server indicating the match.

Various aspects of the disclosure may provide, in certain instances, one or more benefits and advantages. For example, processing requirements of remote server 12 to analyze external audio identifier 17 received from computing device 2 may be significantly reduced when computing device 2 initially attempts to identify a match between external audio identifier 17 and pre-selected audio identifier 14. In some examples, additional processing by remote server 12 may be further required only when a match is identified. In some examples, the processing and energy requirements of identifying a match on computing device 2 may be advantageously minimized because computing device 2 may only attempt to identify a match using the pre-selected audio identifiers 14 sent by remote server 12. In some examples, the processing and energy requirements of computing device 2 may be further reduced by implementing a light-weight matching algorithm.

Various aspects of the disclosure may be operable only when the user has explicitly enabled such functionality. In addition, various aspects of the disclosure may be disabled by the user. Thus, a user may elect to prevent computing device 2 from sending external audio identifier 17 and/or match indicator message 16 to remote server 12. In addition, a user may prevent computing device 2 from receiving external audio content 20 (as shown in FIG. 1) from external audio source 18. More generally, privacy controls may be applied to all aspects of the disclosure based on a user's privacy preferences to honor the user's privacy preferences for opting in or opting out of the functionality described in this disclosure. For example, by default, computing device 2 may be configured to not transmit any information that could be used to identify the user or the device. In some examples, the user may have to expressly override the default configuration in order for the device to transmit such information.

Figure 2:
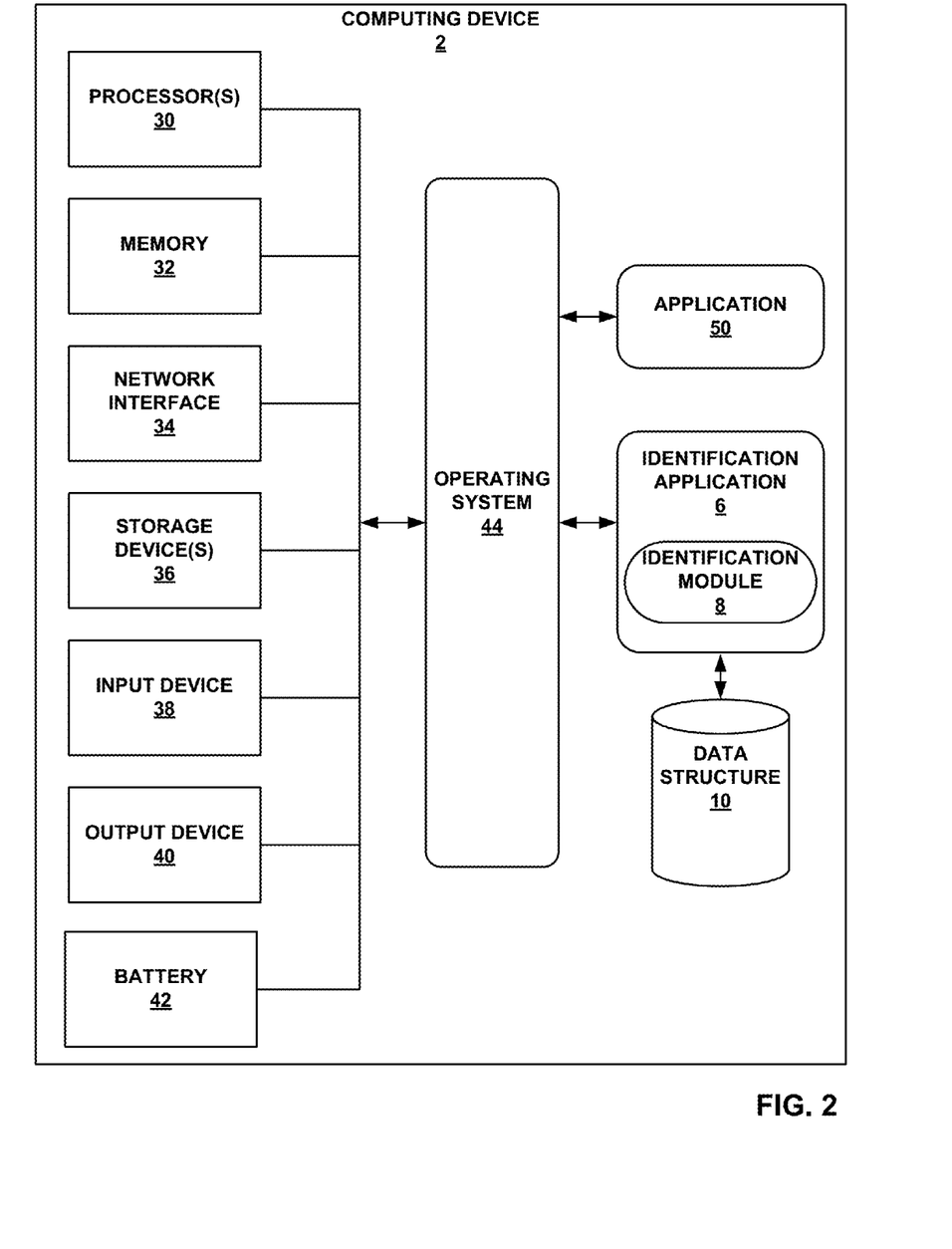
FIG. 2 is a block diagram illustrating further details of one example of the computing device shown in FIG. 1, in accordance with one or more aspects of the present disclosure.

FIG. 2 is a block diagram illustrating further details of one example of computing device 2 shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes one or more processors 30, memory 32, a network interface 34, one or more storage devices 36, input device 38, output device 40, and battery 42. Computing device 2 also includes an operating system 44, input event module 46, and output event module 48, which may include modules that are executable by computing device 2. Computing device 2 may further include one or more applications 50 and a calendar application 6. One or more applications 50 and calendar application 6 are also executable by computing device 2. Each of components 30, 32, 34, 36, 38, 40, 42, 44, 46, 48, 50, and 6 may be interconnected (physically, communicatively, and/or operatively) for inter-component communications.

Processors 30 may be configured to implement functionality and/or process instructions for execution within computing device 2. Processors 30 may be capable of processing instructions stored in memory 32 or instructions stored on storage devices 36.

Memory 32 may be configured to store information within computing device 2 during operation. Memory 32 may, in some examples, be described as a computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 50) to temporarily store information during program execution.

Storage devices 36 may also include one or more computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 2 also includes a network interface 34. Computing device 2 may utilize network interface 34 to communicate with external devices via one or more networks, such as one or more wireless networks. Network interface 34 may be a network interface card, such as an Ethernet card, an optical transceiver, a radio frequency transceiver, or any other type of device that can send and receive information. Other examples of such network interfaces may include Bluetooth®, 3G and WiFi® radios in mobile computing devices as well as USB. In some examples, computing device 2 may utilize network interface 34 to wirelessly communicate with an external device (not shown) such as a server, mobile phone, or other networked computing device.

Computing device 2 may also include one or more input devices 38 (e.g., input device (microphone) 4 of FIG. 1). Input device 38 may be configured to receive input from a user through tactile, audio, or video feedback. Examples of input device 38 may include a touch-sensitive screen, mouse, a keyboard, a voice responsive system, or any other type of device for detecting a command from a user. In some examples, input device 38 may include a touch-sensitive screen, mouse, keyboard, microphone (e.g., shown as input device 4 in FIG. 1), or video camera.

One or more output devices 40 may also be included in computing device 2. Output device 40 may be configured to provide output to a user using tactile, audio, or video stimuli. Output device 40 may include a touch-sensitive screen, sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can generate intelligible output to a user.

Computing device 2 may include one or more batteries 42, which may be rechargeable and provide power to computing device 2. Battery 42 may be made from nickel-cadmium, lithium-ion, or other suitable material.

Computing device 2 may include operating system 44. Operating system 44 may control the operation of components of computing device 2. For example, operating system 44 may facilitate the interaction of application 50 or identification application 6 with processors 30, memory 32, network interface 34, storage device 36, input device 38, output device 40, and battery 42.

Computing device 2 may further include identification application 6. Identification application 6 may include, e.g., identification application 6 as shown in FIG. 1. Identification application 6 may further include an identification module 8. Identification module 8 may include instructions that cause identification application 6 executing on computing device 2 to perform various operations and actions described in FIG. 1-5. For example, when external audio content is received by input device 38, e.g., input device 4 shown in FIG. 1, identification module 8 may process the external audio content using an audio identifier generating algorithm to create an external audio identifier. In some examples, identification module 8 may compare an external audio identifier and a pre-selected audio identifier to identify a match using a matching algorithm. In some examples identification module 8 may store and retrieve audio identifiers in data structure 10.

Any applications, e.g. application 50 or identification application 6, implemented within or executed by computing device 2 may be implemented or contained within, operable by, executed by, and/or be operatively/communicatively coupled to components of computing device 2, e.g., processors 30, memory 32, network interface 34, and/or storage devices 36.

Figure 3:
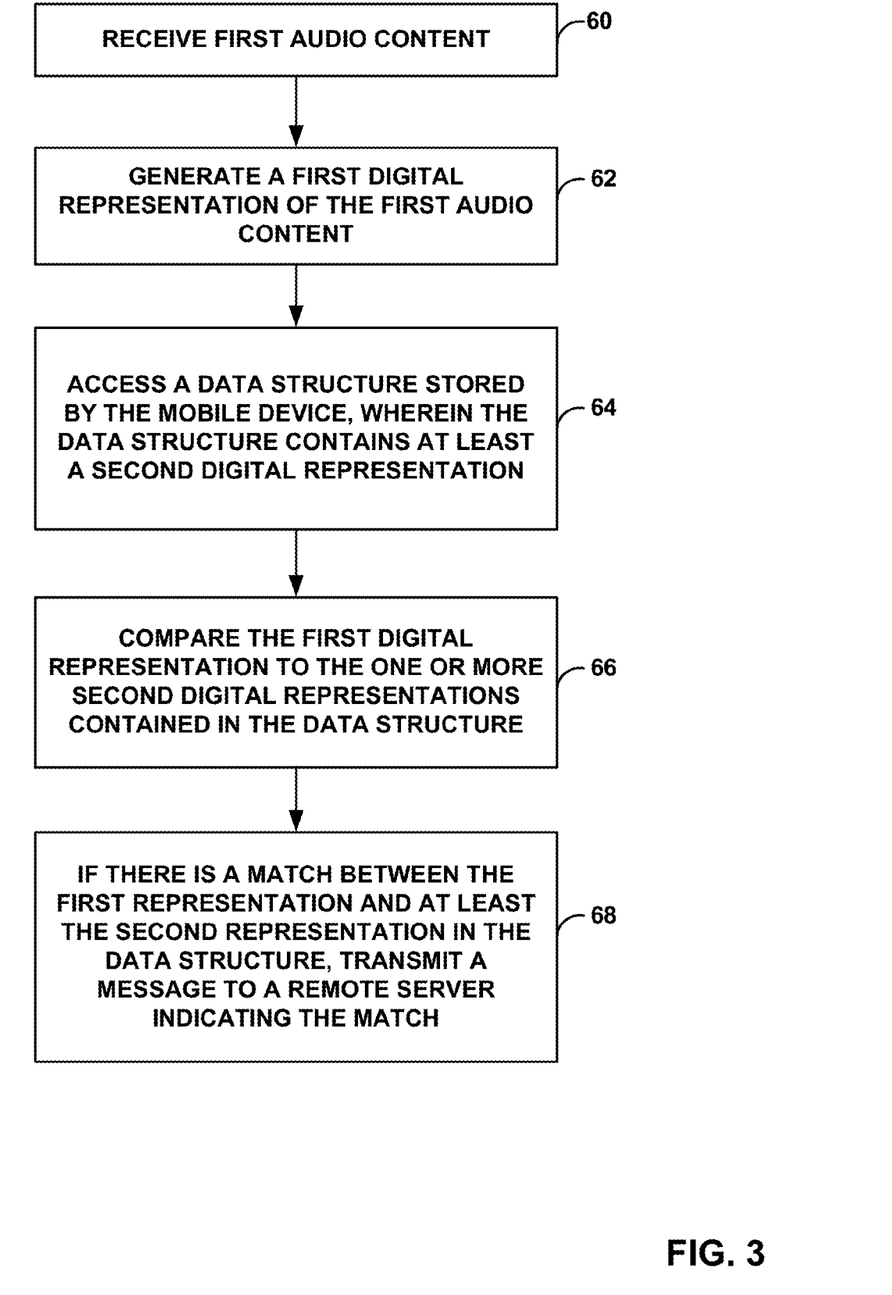
FIG. 3 is a flow diagram illustrating an example method that may be performed by a computing device to measure a user's exposure to television and audio advertisements using a mobile device.

FIG. 3 is a flow diagram illustrating an example method that may be performed by a computing device to determine a user's potential exposure to audio content using a mobile device. For example, the method illustrated in FIG. 3 may be performed by computing device 2 shown in FIGS. 1 and/or 2.

The method of FIG. 3 includes, receiving, by a mobile device, first audio content (60). The method further includes generating, by the mobile device, a first digital representation of the first audio content (62). The method further includes accessing, by the mobile device, a data structure stored by the mobile device, wherein the data structure contains at least a second digital representation of at least second audio content (64). The method further includes comparing, by the mobile device, the first digital representation to the at least second digital representation contained in the data structure (66). The method further includes, if there is a match between the first digital representation and at least the second digital representation contained in the data structure, transmitting, by the mobile device, a message to a remote server indicating the match (68).

In some examples, the match indicates a degree of similarity, within a similarity interval, between the first digital representation and the second digital representation. In some examples, the degree of similarity includes a ratio of perceptual equivalence between the first digital representation and the second digital representation. In some examples, the method includes determining, by the mobile device, that the degree of similarity between the first digital representation and the second digital representation is within a first similarity interval or a second similarity interval, wherein each of the first and second similarity intervals includes a range of degrees of similarity. In some examples, the first similarity interval includes a first range of degrees of similarity, the second similarity interval includes a second range of degrees of similarity, and each degree of similarity in the first range is greater than each degree of similarity in the second range.

In some examples, if the degree of similarity between the first digital representation and the second digital representation is within the first similarity interval, the message includes data that indicates the match. In some examples, if the degree of similarity between the first digital representation and the second digital representation is within the second similarity interval, the message includes data that represents at least part of the second digital representation. In some examples, the method includes determining, by the mobile device, there is no match between the first digital representation and the second digital representation if the degree of similarity between the first digital representation and the second digital representation is less than the degrees of similarity of the first similarity interval and the second similarity interval; and if there is no match, refraining from transmitting the message from the mobile device to the remote server.

In some examples, the method includes, wherein comparing the first digital representation and the second digital representation further includes identifying the match by comparing one or more audio coefficients of the first digital representation to one or more audio coefficients of the second digital representation, wherein an audio coefficient of the one or more audio coefficients of the first digital representation includes a first value that approximately represents a first audio signal of the first audio content; and wherein an audio coefficient of the one or more audio coefficients of the second digital representation of the second audio content includes a second value that approximately represents a second audio signal of the second audio content.

In some examples, the method includes, wherein comparing the first digital representation and the second digital representation further includes performing a pre-defined quantity of comparisons. In some examples, the method includes, wherein comparing the first digital representation and the second digital representation further includes comparing a first rate of zero crossings of the first digital representation and a second rate of zero crossings of the second digital representation.

In some examples, the method includes, wherein comparing the first digital representation and the second digital representation further includes transmitting a probability of the match to the remote server. In some examples, the method includes, transmitting, by the mobile device, a geographic location of the mobile device to the remote server; and receiving the first digital representation from the remote server, wherein a relevance of the first digital representation corresponds to the geographic location of the mobile device. In some examples, a relevance of the first digital representation received from the remote server corresponds to a user profile that includes data associated with characteristics or use patterns of a user. A user profile, in some examples, may include data that corresponds to characteristics or use patterns of a user. In some examples, the user profile includes data such as, a user age, one or more user preferences, or one or more user habits. In some examples, the first digital representation identifies media content that includes at least one of an advertisement, a product placement, or a media program. In some examples, the message indicating the match includes the audio identifier.

Figure 4:
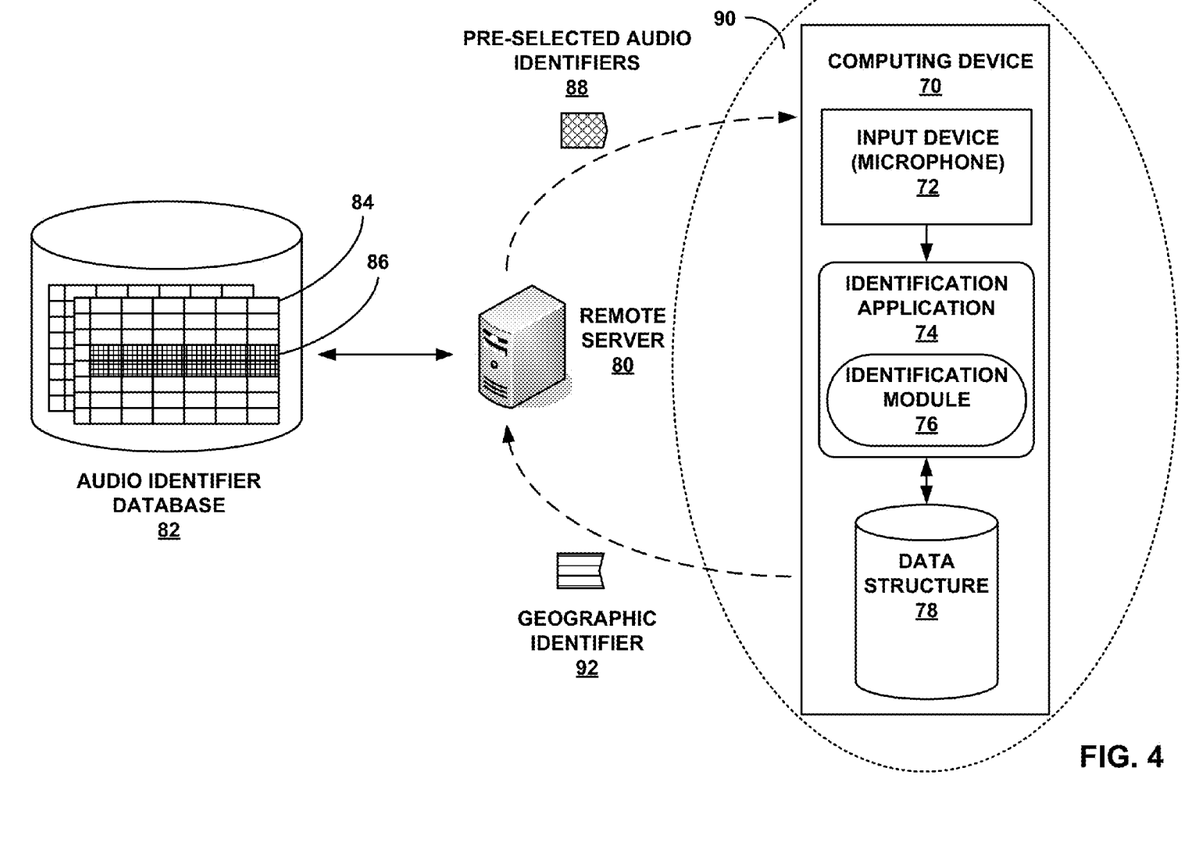
FIG. 4 is a block diagram illustrating an example of a computing device that may be configured to execute an identification application and receive one or more pre-selected audio identifiers based on the geographic location of computing device, in accordance with one or more aspects of the present disclosure.

FIG. 4 is a block diagram illustrating an example of a computing device 70 that may be configured to execute an identification application 74 and receive one or more pre-selected audio identifiers 88 based on the geographic location of computing device 70, in accordance with one or more aspects of the present disclosure. FIG. 4 illustrates computing device 70, which further includes an input device (microphone) 72, identification module 76, and data structure 78. FIG. 4 further illustrates a remote server 80, geographic identifier 92, and audio identifier database 82. Elements in FIG. 4, previously disclosed in FIG. 1, include the same or similar characteristics as described in FIG. 1 unless otherwise described hereinafter (e.g., remote server 80 and remote server 12 of FIG. 1). In some examples, remote server 80 may use a geographic identifier 92 from computing device 70 to select a set of pre-selected audio identifiers 88. For example, computing device 70 may include hardware and/or software that identifies a geographic location 90 of computing device 70 using, e.g., a global positioning system (GPS). The geographic location of computing device 70 may include geographic coordinates such as a latitude and longitude in a geographic coordinate system. In some examples, the geographic coordinates may be included in geographic identifier 92 and computing device 70 may send geographic identifier 92 to remote server 80.

As described in FIG. 1, it may be advantageous to send only a subset of audio identifiers stored in audio identifier database 82 to computing device 70. In one example, remote server 80 may select audio identifiers from audio identifier database 82 based on the geographic location 90 of computing device 70. For example, remote server 80 may initially receive geographic identifier 92 from computing device 70.

Remote server 80 may subsequently select geographic coordinates included in geographic identifier 92 that correspond to geographic location 90 of computing device 70. Remote server 80 may use the geographic coordinates to identify geographically relevant audio identifiers 86 in audio identifier database 82 that will be sent to computing device 70 as pre-selected audio identifiers 88.

For example, audio identifier database 82 may include one or more audio identifiers, and each audio identifier may be selectable based on a geographical location. In some examples, remote server 80 may select geographically relevant audio identifiers 86. Geographically relevant audio identifiers 86 may correspond to audio content that may be broadcasted or otherwise provided geographically close or near to the geographic location of computing device 70. In this way, the quantity of audio identifiers sent to computing device 70 may be minimized and only those audio identifiers that are geographically relevant may be sent as pre-selected audio identifiers 88.

Figure 5:
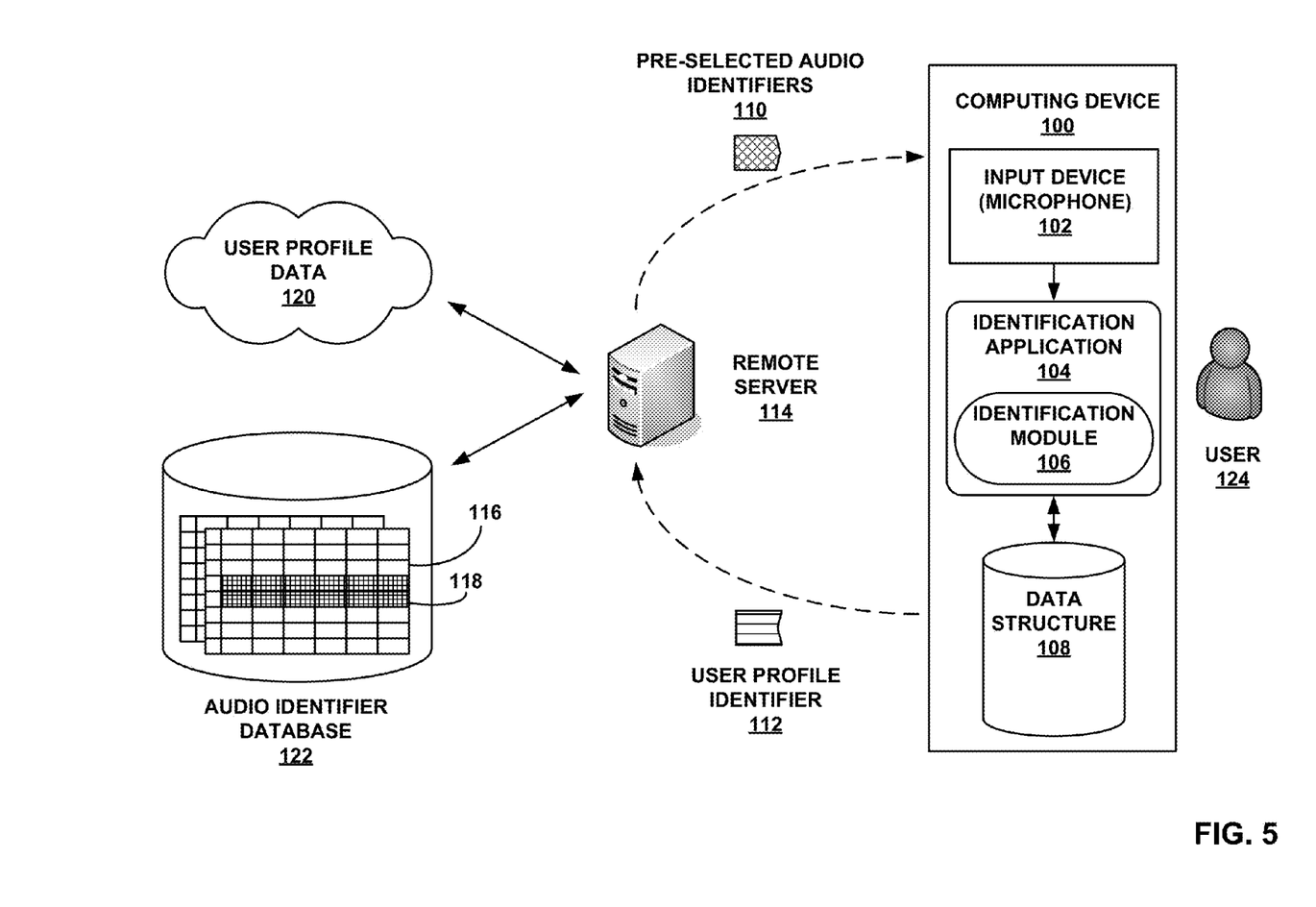
FIG. 5 is a block diagram illustrating an example of a computing device that may be configured to execute an identification application and receive one or more pre-selected audio identifiers based on a user profile of user, in accordance with one or more aspects of the present disclosure.

FIG. 5 is a block diagram illustrating an example of a computing device 100 that may be configured to execute an identification application 104 and receive one or more pre-selected audio identifiers 110 based on a user profile of user 124, in accordance with one or more aspects of the present disclosure. FIG. 5 illustrates computing device 100, which further includes input device (microphone) 102, identification module 106, and data structure 108. FIG. 5 further illustrates a remote server 114, a user profile identifier 112, user profile data 120, and an audio identifier database 122. Elements in FIG. 5, previously disclosed in FIG. 1, include the same or similar characteristics as described in FIG. 1 and/or FIG. 4 unless otherwise described hereinafter (e.g., remote server 114 and remote server 12 of FIG. 1).

In some examples, remote server 114 may use a user profile identifier 112 from computing device 100 to select a set of pre-selected audio identifiers 110. In some examples, a user profile includes user 124's demographic information. In other examples, a user profile includes information describing user 124's purchasing habits, Internet preferences, and other user-specific data. A user's profile may update frequently and automatically as the user interacts with computing device 100 on a regular basis. In some examples, user profile data may be stored by remote server 114. In other examples, user profile data 120 may be stored in data centers and accessed by remote server 114 via a service, e.g., using a cloud computing model.

As described previously, it may be advantageous to send only a subset of audio identifiers stored in audio identifier database 82 to computing device 100. In one example, remote server 114 may select audio identifiers from audio identifier database 122 based on a user profile of user 124. For example, computing device 100 may initially send user profile identifier 112 to remote server 114. User profile identifier 112 may include information that uniquely identifies user 124 and user profile data 120. For example, a username, unique user identifier, name, email address or other identifier may be included in user profile identifier 112. Remote server 114 may use user profile identifier 112 to retrieve a user profile of user 124 from user profile data 120. Remote server 114 may use information in the user profile to select relevant audio identifiers from audio identifier database 122. For example, user profile information of user 124 may include information containing age, frequently-visited websites, and favorite television shows.

In one example, remote server 114 may identify one of user 124's favorite television shows. Remote server 114 may further identify advertisements that will be broadcasted during the television show. Using this information, remote server 114 may select audio identifiers 118 corresponding to the advertisements that are will be broadcasted during the television show. In this way, pre-selected audio identifiers 110 include audio identifiers that are identified by and relevant to the user profile. Using this example technique, the quantity of audio identifiers sent to computing device 70 may be minimized to only relevant audio identifiers.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
receiving, by a mobile device, first audio content;
generating, by the mobile device, a first digital representation of the first audio content;
accessing, by the mobile device, a data structure stored by the mobile device, wherein the data structure contains at least a second digital representation of at least second audio content;
comparing, by the mobile device, the first digital representation to at least the second digital representation contained in the data structure; and
if there is not a match between the first digital representation and at least the second digital representation, that indicates a degree of similarity within a similarity interval, transmitting, by the mobile device, a message to a remote server comprising data that represents at least part of the first digital representation for a comparison at the remote server of the first digital representation and at least the second digital representation that is more accurate than the comparison by the mobile device of the first digital representation and at least the second digital representation.

2. The method of claim 1, wherein the match indicates a degree of similarity, within the similarity interval, between the first digital representation and the second digital representation.

3. The method of claim 2, further comprising:
determining, by the mobile device, that the degree of similarity between the first digital representation and the second digital representation is within a first similarity interval or a second similarity interval, wherein each of the first and second similarity intervals comprises a range of degrees of similarity.

4. The method of claim 3,
wherein the first similarity interval includes a first range of degrees of similarity,
wherein the second similarity interval includes a second range of degrees of similarity, and
wherein each degree of similarity in the first range is greater than each degree of similarity in the second range.

5. The method of claim 4, further comprising:
if the degree of similarity between the first digital representation and the second digital representation is within the first similarity interval, the message comprises data that indicates the match.

6. The method of claim 4, further comprising:
if the degree of similarity between the first digital representation and the second digital representation is within the second similarity interval, the message comprises data that represents at least part of the second digital representation.

7. The method of claim 4, further comprising:
determining, by the mobile device, there is no match between the first digital representation and the second digital representation when the degree of similarity between the first digital representation and the second digital representation is less than the degrees of similarity of the first similarity interval and the second similarity interval; and
if there is no match, refraining from transmitting the message from the mobile device to the remote server.

8. The method of claim 2, wherein the degree of similarity comprises a ratio of perceptual equivalence between the first digital representation and the second digital representation.

9. The method of claim 1, wherein a relevance of the first digital representation received from the remote server corresponds to a user profile that includes data associated with characteristics or use patterns of a user.

10. The method of claim 9, wherein the user profile further comprises data including at least one of a user age, one or more user preferences, or one or more user habits.

11. The method of claim 1, wherein comparing, by the mobile device, the first digital representation to the second digital representation further comprises executing, by the mobile device, a matching algorithm, wherein the matching algorithm compares perceptual features of the first digital representation to perceptual features of the second digital representation.

12. The method of claim 11, wherein a second matching algorithm executing on the remote server is the same matching algorithm executing by the mobile device.

13. The method of claim 1, wherein comparing the first digital representation and the second digital representation further comprises identifying the match by comparing one or more audio coefficients of the first digital representation to one or more audio coefficients of the second digital representation,
 wherein an audio coefficient of the one or more audio coefficients of the first digital representation comprises a first value that approximately represents a first audio signal of the first audio content; and
 wherein an audio coefficient of the one or more audio coefficients of the second digital representation comprises a second value that approximately represents a second audio signal of the at least second audio content.

14. The method of claim 1, wherein comparing the first digital representation and the second digital representation further comprises performing a pre-defined quantity of comparisons.

15. The method of claim 1, wherein comparing the first digital representation and the second digital representation further comprises comparing a first rate of zero crossings of the first digital representation and a second rate of zero crossings of the second digital representation,
 wherein the first rate of zero crossings comprises a first pattern of sign changes of a first function that approximately represents a first audio signal of the first audio content, and
 wherein the second rate of zero crossings comprises a second pattern of sign changes of a second function that approximately represents a second audio signal of the at least second audio content.

16. The method of claim 1, wherein comparing the first digital representation and the second digital representation further comprises transmitting a probability of the match to the remote server.

17. The method of claim 1, wherein storing the audio identifier that is received from the remote server further comprises:
 transmitting, by the mobile device, a geographic location of the mobile device to the remote server; and
 receiving the first digital representation from the remote server, wherein a relevance of the first digital representation corresponds to the geographic location of the mobile device.

18. The method of claim 1, wherein the first digital representation identifies media content comprising at least one of an advertisement, a product placement, or a media program.

19. The method of claim 1, wherein the message indicating the match comprises the audio identifier.

20. The method of claim 1, further comprising:
 storing, by the mobile device, an audio identifier that is received from the remote server, wherein the audio identifier is generated by the remote server and comprises at least the second digital representation.

21. The method of claim 20, wherein the remote server is capable of recognizing that the mobile device has received the at least second audio content.

22. A computer-readable storage medium encoded with instructions that cause one or more processors of a computing device to perform operations comprising:
 receiving first audio content;
 generating a first digital representation of the first audio content;
 accessing a data structure stored by the mobile device, wherein the data structure contains at least a second digital representation of at least second audio content;
 comparing the first digital representation to at least the second digital representation contained in the data structure; and
 if there is not a match between the first digital representation and at least the second digital representation, that indicates a degree of similarity within a similarity interval, transmitting, by the mobile device, a message to a remote server comprising data that represents at least part of the first digital representation for a comparison at the remote server of the first digital representation and at least the second digital representation that is more accurate than the comparison by the mobile device of the first digital representation and at least the second digital representation.

23. A computing device, comprising:
 one or more processors;
 an identification module operable by the one or more processors to receive first audio content and generate a first digital representation of the first audio content;
 wherein the identification module is operable by the one or more processors to access a data structure stored by the mobile device, wherein the data structure contains at least a second digital representation of at least second audio content;
 means for comparing the first digital representation to at least the second digital representation contained in the data structure; and
 wherein the identification module is further operable by the one or more processors to, if there is a match between the first digital representation and at least the second digital representation contained in the data structure, transmit a message to a remote server comprising data that represents at least part of the first digital representation for a comparison at the remote server of the first digital representation and at least the second digital representation that is more accurate than the comparison by the mobile device of the first digital representation and at least the second digital representation.

* * * * *